United States Patent
Jo et al.

(10) Patent No.: US 11,353,251 B2
(45) Date of Patent: Jun. 7, 2022

(54) AIR CONDITIONER WITH FLUID LINE DIAGNOSTICS USING FEEDBACK SIGNALS FROM A PUMP

(71) Applicant: LG ELECTRONICS INC., Seoul (KR)

(72) Inventors: Ahrae Jo, Seoul (KR); Chiwoo Song, Seoul (KR); Yongcheol Sa, Seoul (KR); Youngjoo Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 93 days.

(21) Appl. No.: 16/996,341

(22) Filed: Aug. 18, 2020

(65) Prior Publication Data

US 2021/0247119 A1    Aug. 12, 2021

(30) Foreign Application Priority Data

Feb. 6, 2020  (KR) .......................... 10-2020-0014186

(51) Int. Cl.
*F25B 49/00* (2006.01)
*F25B 41/40* (2021.01)
*F25B 13/00* (2006.01)

(52) U.S. Cl.
CPC ............ *F25B 49/005* (2013.01); *F25B 13/00* (2013.01); *F25B 41/40* (2021.01); *F25B 2500/04* (2013.01)

(58) Field of Classification Search
CPC .... F25B 13/00; F25B 2500/04; F25B 25/005; F25B 41/40
See application file for complete search history.

(56) References Cited

U.S. PATENT DOCUMENTS

| 6,672,147 B1* | 1/2004 | Mazet ..................... F02D 41/22 73/114.43 |
| 2011/0163170 A1* | 7/2011 | Feldstein .................. F24F 6/14 236/44 A |
| 2011/0178773 A1 | 7/2011 | Shahi et al. |
| 2011/0302941 A1 | 12/2011 | Takata |
| 2014/0214214 A1 | 7/2014 | Asmus et al. |
| 2014/0305152 A1 | 10/2014 | Morimoto et al. |
| 2015/0047379 A1* | 2/2015 | Honda ..................... F25D 17/02 62/125 |
| 2017/0261242 A1 | 9/2017 | Yasuo et al. |

FOREIGN PATENT DOCUMENTS

| CN | 109000306 | 12/2018 |
| KR | 10-1151867 | 5/2012 |
| WO | WO 2018/154768 | 8/2018 |

OTHER PUBLICATIONS

European Search Report dated Feb. 23, 2021 issued in EP Application No. 20194510.2.
International Search Report dated Dec. 2, 2020 issued in Application No. PCT/KR2020/011042.

* cited by examiner

*Primary Examiner* — Henry T Crenshaw
(74) *Attorney, Agent, or Firm* — Ked & Associates LLP

(57) ABSTRACT

An air conditioning apparatus and a method for controlling an air conditioning apparatus are provided. The air conditioning apparatus may include a controller that performs an abnormal operation diagnosis of the air conditioning apparatus based on an output signal of a pump, thereby directly checking introduction of air into pipes or clogging of valves.

18 Claims, 6 Drawing Sheets

AIR CONDITIONER WITH FLUID LINE DIAGNOSTICS USING FEEDBACK SIGNALS FROM A PUMP

CROSS-REFERENCE TO RELATED APPLICATION(S)

The present application claims priority under 35 U.S.C. 119 and 35 U.S.C. 365 to Korean Patent Application No. 10-2020-0014186, filed in Korea on Feb. 6, 2020, which is hereby incorporated by reference in its entirety.

BACKGROUND

1. Field

An air conditioning apparatus and a method for controlling an air conditioning apparatus are disclosed herein.

2. Background

An air conditioning apparatus is an apparatus for maintaining air in a predetermined space in a most suitable state according to a usage and purpose. Generally, the air conditioning apparatus includes a compressor, a condenser, an expansion device, and an evaporator. A refrigeration cycle that performs compression, condensation, expansion, and evaporation processes of a refrigerant is driven to cool or heat the predetermined space.

When the air conditioning apparatus performs a cooling operation, an outdoor heat exchanger provided in an outdoor unit functions as a condenser, and an indoor heat exchanger provided in an indoor unit functions as an evaporator. When the air conditioning apparatus performs a heating operation, the indoor heat exchanger functions as a condenser, and the outdoor heat exchanger functions as an evaporator.

Recently, there has been a tendency to limit a type of refrigerant used in the air conditioning apparatus and reduce an amount of refrigerant used in accordance with environmental regulation policy. In order to reduce the amount of refrigerant used, a technique for performing cooling or heating by performing heat exchange between a refrigerant and a predetermined fluid has been proposed. For example, the predetermined fluid may include water.

U.S. Patent Publication No. 2011/0302941 (hereinafter, "related art document") published on Dec. 15, 2011 and entitled "Air Conditioning Apparatus", which is hereby incorporated by reference, discloses an air conditioning apparatus that performs cooling or heating through heat exchange between a refrigerant and water. The air conditioning apparatus disclosed in the related art document is configured to sense a temperature of input/output water of a heat exchanger to determine whether air is introduced into a water pipe due to leakage in the water pipe. The change in temperature is analyzed to determine whether air is introduced into the water pipe by water leakage in the water pipe.

When air is introduced into the water pipe provided in the air conditioning apparatus, a flow rate of the water decreases and a heat exchange performance is further lowered in a cooling or heating operation than in a normal operation. In order to prevent this problem, the air conditioning apparatus disclosed in the related art document performs the above control for diagnosing whether air is introduced into the water pipe.

However, according to the air conditioning apparatus disclosed in the related art document, the following problems may occur.

A temperature or pressure in a cycle of the air conditioning apparatus may change as a result of whether air is introduced into the water pipe. However, the temperature or pressure may deviate from a normal range when the heat exchanger itself fails or the problem occurs in other components of the air conditioning apparatus.

Therefore, a method of determining whether abnormal operations are performed through information, such as temperature or pressure, in the cycle of the air conditioning apparatus, is an indirect method. As this method may be recognized as one problem during abnormal operations due to various factors, it is highly likely to cause a diagnostic error.

BRIEF DESCRIPTION OF THE DRAWINGS

Embodiments will be described in detail with reference to the following drawings in which like reference numerals refer to like elements, and wherein.

DETAILED DESCRIPTION

Figure 1:
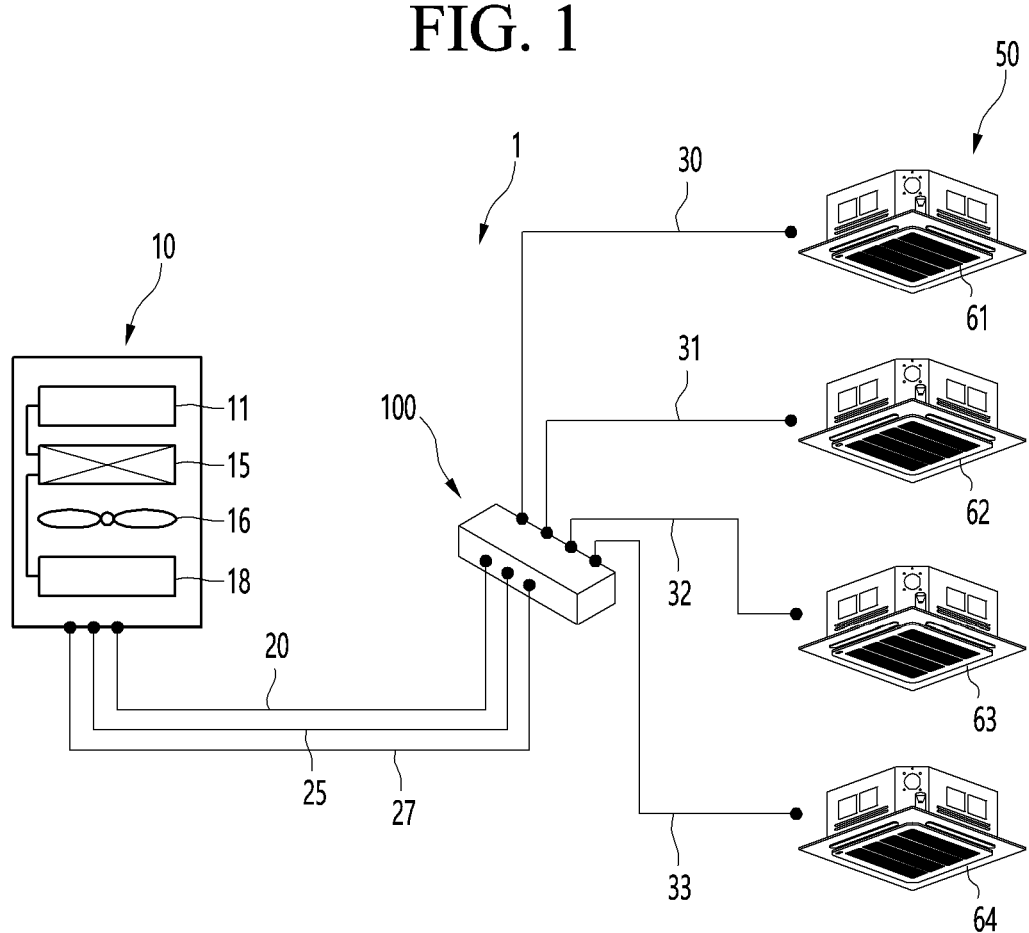
FIG. 1 is a schematic diagram of an air conditioning apparatus according to an embodiment.

Hereinafter, embodiments will be described with reference to the drawings. It should be noted that the same or like components are denoted by the same or like reference numerals even though shown in different drawings. In describing embodiments, when description of relevant functions or configurations is determined to unnecessarily obscure the gist, the description has been omitted.

In describing components of embodiments, terms such as first, second, A, B, (a), and (b) may be used. These terms are only used for distinguishing a component from another, and the nature, order, or sequence of the components is not limited by these terms. When a component is described as being "connected" or "coupled" to another component, it should be understood that the component may be directly connected or coupled to the other component, but another component may be "connected" or "coupled" between the components.

Figure 2:
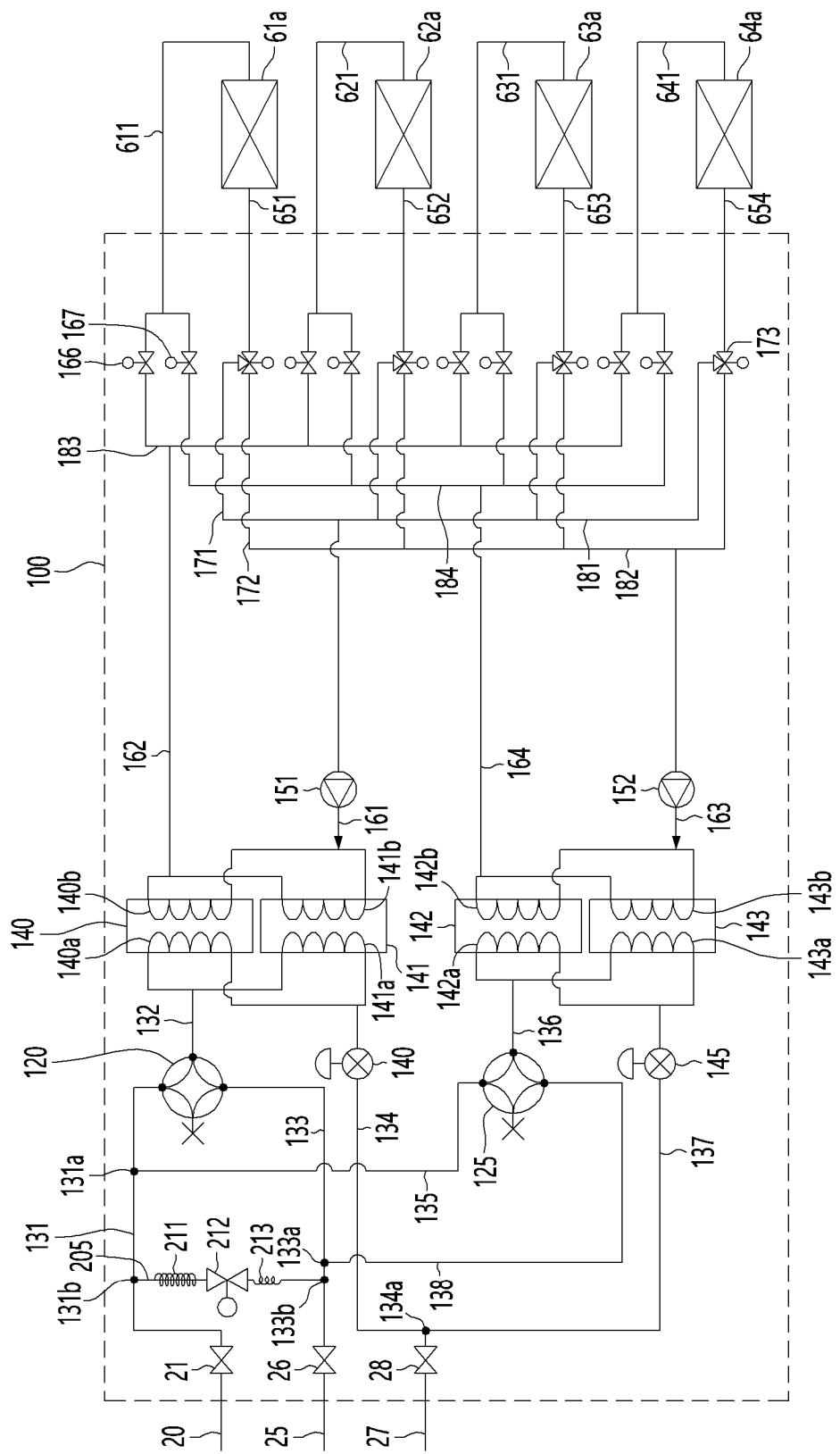
FIG. 2 is a cycle diagram of an air conditioning apparatus according to an embodiment.

FIG. 1 is a schematic diagram of an air conditioning apparatus according to an embodiment. FIG. 2 is a cycle diagram of an air conditioning apparatus according to an embodiment.

Referring to FIGS. 1 and 2, air conditioning apparatus 1 according to an embodiment may include an outdoor unit 10, an indoor unit 50, and a heat exchange device 100 connected to the outdoor unit 10 and the indoor unit 50. The outdoor unit 10 and the heat exchange device 100 may be fluidly connected by a first fluid. For example, the first fluid may include a refrigerant. The refrigerant may flow through the outdoor unit 10 and a refrigerant-side or first fluid-side passage of a heat exchanger provided in the heat exchange device 100.

The outdoor unit 10 may include a compressor 11 and an outdoor heat exchanger 15. An outdoor fan 16 may be provided on or at one or a first side of the outdoor heat exchanger 15 to blow outside air toward the outdoor heat exchanger 15. The outdoor fan 16 may be driven to perform heat exchange between the outside air and the refrigerant of the outdoor heat exchanger 15. The outdoor unit 10 may further include an electronic expansion valve (EEV) 18.

The air conditioning apparatus 1 may further include connecting pipes 20, 25, and 27 that connect the outdoor unit 10 to the heat exchange device 100. The connecting pipes 20, 25, and 27 may include first outdoor unit connecting pipe 20 as a gas pipe (high pressure gas pipe) through which a high pressure gas refrigerant may flow, second outdoor unit connecting pipe 25 as a gas pipe (low pressure gas pipe) through which a low pressure gas refrigerant may flow, and third outdoor unit connecting pipe 27 as a liquid pipe through which a liquid refrigerant may flow. That is, the outdoor unit 10 and the heat exchange device 100 may have a "three-pipe connection structure", and the three connecting pipes 20, 25, and 27 may cause the refrigerant to circulate through the outdoor unit 10 and the heat exchange device 100.

The heat exchange device 100 and the indoor unit 50 may be fluidly connected by a second fluid. For example, the second fluid may include water. The second fluid may flow through the indoor unit 50 and a water-side or second fluid-side passage of a heat exchanger provided in the heat exchange device 100.

The heat exchange device 100 may include a plurality of heat exchangers 140, 141, 142, and 143. The heat exchangers may be, for example, plate heat exchangers.

The indoor unit 50 may include a plurality of indoor units 61, 62, 63, and 64. However, there is no limitation to the number of indoor units 61, 62, 63, and 64. In FIG. 1, for example, four indoor units 61, 62, 63, and 64 are illustrated as being connected to the heat exchange device 100. The plurality of indoor units 61, 62, 63, and 64 may include first indoor unit 61, second indoor unit 62, third indoor unit 63, and fourth indoor unit 64.

The air conditioning apparatus 1 may further include pipes 30, 31, 32, and 33 that connect the heat exchange device 100 to the indoor unit 50. The pipes 30, 31, 32, and 33 may be pipes through which a fluid, such as water may flow. The pipes 30, 31, 32, and 33 may include first indoor unit connecting pipe 30, second indoor unit connecting pipe 31, third indoor unit connecting pipe 32, and fourth indoor unit connecting pipe that connect the heat exchange device 100 to the indoor units 61, 62, 63, and 64.

The fluid, such as water, may circulate through the heat exchange device 100 and the indoor unit 50 through the indoor unit connecting pipes 30, 31, 32, and 33. When the number of indoor units increases, the number of pipes connecting the heat exchange device 100 to the indoor units may increase.

With this configuration, the refrigerant circulating through the outdoor unit 10 and the heat exchange device 100 and the fluid circulating through the heat exchange device 100 and the indoor unit 50 exchange heat through the heat exchangers 140, 141, 142, and 143 provided in the heat exchange device 100. The fluid cooled or heated through the heat exchange may exchange heat with the indoor heat exchangers 61a, 62a, 63a, and 64a provided in the indoor unit 50 to cool or heat the indoor space.

The plurality of heat exchangers 140, 141, 142, and 143 may be provided in a same number as the number of the plurality of indoor units 61, 62, 63, and 64. Alternatively, two or more indoor units may be connected to one heat exchanger.

Hereinafter, the heat exchange device 100 will be described with reference to the accompanying drawings.

The heat exchange device 100 may include the first to fourth heat exchangers 140, 141, 142, and 143 fluidly connected to the indoor units 61, 62, 63, and 64, respectively. The first to fourth heat exchangers 140, 141, 142, and 143 may have a same structure. The heat exchangers 140, 141, 142, and 143 may each include, for example, a plate heat exchanger, and may be configured such that fluid and refrigerant passages are alternately stacked.

The heat exchangers 140, 141, 142, and 143 may include refrigerant passages 140a, 141a, 142a, and 143a and fluid passages 140b, 141b, 142b, and 143b, respectively. The refrigerant passages 140a, 141a, 142a, and 143a may be fluidly connected to the outdoor unit 10. The refrigerant discharged from the outdoor unit 10 may be introduced into the refrigerant passages 140a, 141a, 142a, and 143a, or the refrigerant having passed through the refrigerant passages 140a, 141a, 142a, and 143a may be introduced into the outdoor unit 10.

The fluid passages 140b, 141b, 142b, and 143b may be connected to the indoor units 61, 62, 63, and 64, respectively. The fluid discharged from the indoor units 61, 62, 63, and 64 may be introduced into the fluid passages 140b, 141b, 142b, and 143b, and the fluid having passed through the fluid passages 140b, 141b, 142b, and 143b may be introduced into the indoor units 61, 62, 63, and 64.

The heat exchange device 100 may include a first connecting pipe 131 connected to the first outdoor unit connecting pipe 20 through a first service valve 21. The first connecting pipe 131 may extend into the heat exchange device 100 and may be connected to a first port of a first valve 120.

The heat exchange device 100 may include a third connecting pipe 133 connected to the second outdoor unit connecting pipe 25 through a second service valve 26. The third connecting pipe 133 may extend into the heat exchange device 100 and may be connected to a third port of the first valve 120.

The heat exchange device 100 may include a fourth connecting pipe 134 connected to the third outdoor unit connecting pipe 27 through a third service valve 28. The fourth connecting pipe 134 may extend into the heat exchange device 100 and may be connected to the first heat exchanger 140 and the second heat exchanger 141.

The heat exchange device 100 may include a seventh connecting pipe 137 connected to the third outdoor unit connecting pipe 27 through the third service valve 28. The seventh connecting pipe 137 may extend into the heat exchange device 100 and may be connected to the third heat exchanger 142 and the fourth heat exchanger 143.

The seventh connecting pipe 137 may extend from a third branch portion 134a of the fourth connecting pipe 134 and may be connected to the third heat exchanger 142 and the fourth heat exchanger 143. That is, the fourth connecting pipe 134 and the seventh connecting pipe 137 may be pipes branched from pipes extending from the third service valve 28. The first to third outdoor unit connecting pipes 20, 25 and 27 may be connected to the heat exchange device 100 through the first to third service valves 21, 26, and 28, such that the outdoor unit 10 and the heat exchange device 100 form the "three-pipe connection".

The first heat exchanger 140 may include the first refrigerant passage 140a and the first fluid passage 140b. One or a first side of the first refrigerant passage 140a may be connected to a second connecting pipe 132. The second connecting pipe 132 may extend from a second port of the first valve 120 and may be connected to the first heat exchanger 140 and the second heat exchanger 141.

The other or a second side of the first refrigerant passage 140a may be connected to the fourth connecting pipe 134. The fourth connecting pipe 134 may extend from the third service valve 28 and may be connected to the first heat exchanger 140 and the second heat exchanger 141. That is, both sides of the first refrigerant passage 140a may be connected to the second connecting pipe 132 and the fourth connecting pipe 134.

The second heat exchanger 141 may include the second refrigerant passage 141a and the second fluid passage 141b. One or a first side of the second refrigerant passage 141a may be connected to the second connecting pipe 132. The second connecting pipe 132 may be branched and connected to the first heat exchanger 140 and the second heat exchanger 141.

The other or a second side of the second refrigerant passage 141a may be connected to the fourth connecting pipe 134. Both sides of the second refrigerant passage 141a may be connected to the second connecting pipe 132 and the fourth connecting pipe 134. The fourth connecting pipe 134 may be branched and connected to the first heat exchanger 140 and the second heat exchanger 141. The refrigerant discharged from the outdoor unit 10 may be introduced into the first refrigerant passage 140a and the second refrigerant passage 141a through the first connecting pipe 131 and the first valve 120, and the refrigerant having passed through the first refrigerant passage 140a and the second refrigerant passage 141a may be introduced into the outdoor unit 10 through the fourth connecting pipe 134.

The third heat exchanger 142 may include the third refrigerant passage 142a and the third fluid passage 142b. One or a first side of the third refrigerant passage 142a may be connected to a sixth connecting pipe 136. The sixth connecting pipe 136 may extend from a second port of a second valve 125 and be connected to the third heat exchanger 142 and the fourth heat exchanger 143.

The other or a second side of the third refrigerant passage 142a may be connected to the seventh connecting pipe 137. The seventh connecting pipe 137 may extend from the third service valve 28 and may be connected to the third heat exchanger 142 and the fourth heat exchanger 143. That is, both sides of the third refrigerant passage 142a may be connected to the sixth connecting pipe 136 and the seventh connecting pipe 137.

The fourth heat exchanger 143 may include the fourth refrigerant passage 143a and the fourth fluid passage 143b. One or a first side of the fourth refrigerant passage 143a may be connected to the sixth connecting pipe 136. The sixth connecting pipe 136 may be branched and connected to the third heat exchanger 142 and the fourth heat exchanger 143.

The other or a second side of the fourth refrigerant passage 143a may be connected to the seventh connecting pipe 137. Both sides of the fourth refrigerant passage 143a may be connected to the sixth connecting pipe 136 and the seventh connecting pipe 137. The seventh connecting pipe 137 may be branched and connected to the third heat exchanger 142 and the fourth heat exchanger 143.

The refrigerant discharged from the outdoor unit 10 may be introduced into the third refrigerant passage 142a and the fourth refrigerant passage 143a through the first connecting pipe 131 and the second valve 125, and the refrigerant having passed through the third refrigerant passage 142a and the fourth refrigerant passage 143a may be introduced into the outdoor unit 10 through the seventh connecting pipe 137.

A first branch portion 131a may be formed in the first connecting pipe 131. The heat exchange device 100 may further include a fifth connecting pipe 135 connected to the first branch portion 131a and extending to the second valve 125. The fifth connecting pipe 135 may be connected to a first port of the second valve 125.

A second branch portion 133a may be formed in the third connecting pipe 133. The heat exchange device 100 may further include an eighth connecting pipe 138 connected to the second branch portion 133a and extending to the second valve 125. The eighth connecting pipe 138 may be connected to a third port of the second valve 125.

The heat exchange device 100 may include the first valve 120 and the second valve 125 that control a flow direction of the refrigerant. The first valve 120 and the second valve 125 may be, for example, four-way valves or three-way valves. Hereinafter, a case in which the first valve 120 and the second valve 125 are provided as four-way valves will be described.

The first valve 120 may include the first port to which the first connecting pipe 131 may be connected, the second port to which the second connecting pipe 132 may be connected, and the third port to which the third connecting pipe 133 may be connected. A fourth port of the first valve 120 may be closed.

The second valve 125 may include the first port to which the fifth connecting pipe 135 may be connected, the second port to which the sixth connecting pipe 136 may be connected, and the third port to which the eighth connecting pipe 138 may be connected. A fourth port of the second valve 125 may be closed.

The heat exchange device 100 may further include expansion valves 140 and 145 that depressurize the refrigerant. The expansion valves 140 and 145 may include an electronic expansion valve (EEV).

The expansion valves 140 and 145 may decrease a pressure of the refrigerant passing through the expansion valves 140 and 145 through opening control. For example, when the electronic expansion valves 140 and 145 are fully opened (full-open state), the refrigerant may pass without depressurization, and when an opening degree of the expansion valves 140 and 145 decreases, the refrigerant may be depressurized. A degree of depressurization of the refrigerant increases as the opening degree decreases.

The expansion valves 140 and 145 may include first expansion valve 140 installed in the fourth connecting pipe 134. The first expansion valve 140 may be installed in the fourth connecting pipe 134 between the third service valve 38 and the first refrigerant passage 140a or the second refrigerant passage 141a. The expansion valves 140 and 145 may further include second expansion valve 145 installed in the seventh connecting pipe 137.

The heat exchange device 100 may further include a bypass pipe 205 that connects the first connecting pipe 131 to the third connecting pipe 133. The bypass pipe 205 may be understood as a pipe for that prevents liquid refrigerant from being accumulated in a high pressure gas pipe during a cooling operation. One or a first end of the bypass pipe 205 may be connected to a first bypass branch portion 131b of the first connecting pipe 131, and the other or a second end of the bypass pipe 205 may be connected to a second bypass branch portion 133b of the third connecting pipe 133.

The first branch portion 131a may be formed at one point on the first connecting pipe 131 between the first bypass branch portion 131b and the first port of the first valve 120.

The first bypass branch portion 131b may be formed at one point on the first connecting pipe 131 between the first service valve 21 and the first branch portion 131a.

The second branch portion 133a may be formed at one point on the third connecting pipe 133 between the second bypass branch portion 133b and the third port of the first valve 120. The second bypass branch portion 133b may be formed at one point on the third connecting pipe 133 between the second service valve 26 and the second branch portion 133a.

The bypass pipe 205 may be provided with a bypass valve 212 that controls opening and closing of the pipe. For example, the bypass valve 212 may include a two-way valve or a solenoid valve having a relatively low pressure loss.

The bypass pipe 205 may be provided with a strainer 211 that filters waste in the refrigerant flowing through the pipe. For example, the strainer 212 may be made of a metal mesh. The strainer 212 may be disposed at one point between the bypass valve 212 and the first bypass branch portion 131b.

The bypass pipe 205 may further include an expansion device 213 that depressurize the refrigerant flowing through the pipe. For example, the expansion device 213 may be configured as a capillary tube using a capillary phenomenon.

The expansion device 213 may be disposed at one point between the bypass valve 212 and the second bypass branch portion 133b. Therefore, the pressure of the refrigerant passing through the expansion device 213 may drop.

The heat exchange device 100 may further include a heat exchanger inlet pipe and a heat exchanger outlet pipe connected to the fluid passages 140b, 141b, 142b, and 143b of the heat exchangers 140, 141, 142, and 143. A first heat exchanger inlet pipe of the first heat exchanger 140 and a second heat exchanger inlet pipe of the second heat exchanger 141 may be branched from a first common inlet pipe 161. A first pump 151 may be provided in the first common inlet pipe 161.

A third heat exchanger inlet pipe of the third heat exchanger 142 and a fourth heat exchanger inlet pipe of the fourth heat exchanger 143 may be branched from a second common inlet pipe 163. A second pump 152 may be provided in the second common inlet pipe 163.

A first heat exchanger outlet pipe of the first heat exchanger 140 and a second heat exchanger outlet pipe of the second heat exchanger 141 may be branched from a first common outlet pipe 162. A third heat exchanger outlet pipe of the third heat exchanger 142 and a fourth heat exchanger outlet pipe of the fourth heat exchanger 143 may be branched from a second common outlet pipe 164.

A first joint pipe 181 may be connected to the first common inlet pipe 161. A second joint pipe 182 may be connected to the second common inlet pipe 163.

A third joint pipe 183 may be connected to the first common outlet pipe 162. A fourth joint pipe 184 may be connected to the second common outlet pipe 164.

A first fluid discharge pipe 171 through which fluid discharged from the indoor heat exchangers 61a, 62a, 63a, and 64a may flow may be connected to the first joint pipe 181. The first fluid discharge pipe 171 may be branched to four pipes from the first joint pipe 181 in correspondence to the first to fourth indoor units and may be connected to the first to fourth indoor units.

A second fluid discharge pipe 172 through which fluid discharged from the indoor heat exchangers 61a, 62a, 63a, and 64a may flow may be connected to the second joint pipe 182. The second fluid discharge pipe 172 may be branched to four pipes from the second joint pipe 182 in correspondence to the first to fourth indoor units and may be connected to the first to fourth indoor units.

The first fluid discharge pipe 171 and the second fluid discharge pipe 172 may be disposed in parallel and may be connected to common fluid outlet pipes 651, 652, 653, and 654 communicating with the indoor heat exchangers 61a, 62a, 63a, and 64a. The first fluid discharge pipe 171, the second fluid discharge pipe 172, and the common fluid outlet pipe 651, 652, 653, and 654 may be connected by, for example, a three-way valve 173. Therefore, due to the three-way valve 173, the fluid of the common fluid outlet pipes 651, 652, 653, and 654 may flow through one of the first fluid discharge pipe 171 and the second fluid discharge pipe 172.

The common fluid outlet pipes 651, 652, 653, and 654 may be connected to discharge pipes of the indoor heat exchangers 61a, 62a, 63a, and 64a. The third joint pipe 183 may be branched into a plurality of pipes corresponding to the first to fourth indoor units, and fluid to be introduced into the indoor heat exchangers 61a, 62a, 63a, and 64a may flow therethrough. The third joint pipe 183 may be referred to as a "first indoor unit pipe".

The third joint pipe 184 may be branched into a plurality of pipes corresponding to the first to fourth indoor units, and fluid to be introduced into the indoor heat exchangers 61a, 62a, 63a, and 64a may flow therethrough. The fourth joint pipe 184 may be referred to as a "second indoor unit pipe".

The plurality of third joint pipes 183 and the plurality of fourth joint pipes 184 may be disposed in parallel and may be connected to common fluid inlet pipes 611, 621, 631, and 641 communicating with the indoor heat exchangers 61a, 62a, 63a, and 64a.

A first valve 166 may be provided in the third joint pipe 183, and a second valve 167 may be provided in the fourth joint pipe 184. For example, the first valve 166 and the second valve 167 may be configured as a solenoid valve capable of on/off control.

When the first pump 151 is driven, if the first valve 166 is opened, fluid discharged from the first pump 151 may be branched through the plurality of third joint pipes 183 and flow into the indoor units (first to fourth indoor units). The first valve 166 may be referred to as a "first indoor unit valve".

When the second pump 152 is driven, if the second valve 167 is opened, fluid discharged from the second pump 152 may be branched through the plurality of fourth joint pipes 184 and flow into the indoor units (first to fourth indoor units). The second valve 167 may be referred to as a "second indoor unit valve".

For convenience of description, the first heat exchanger 140 and the second heat exchanger 141 may be referred to as a "first-side heat exchanger". In addition, the third heat exchanger 142 and the fourth heat exchanger 143 may be referred to as a "second-side heat exchanger".

Figure 3:
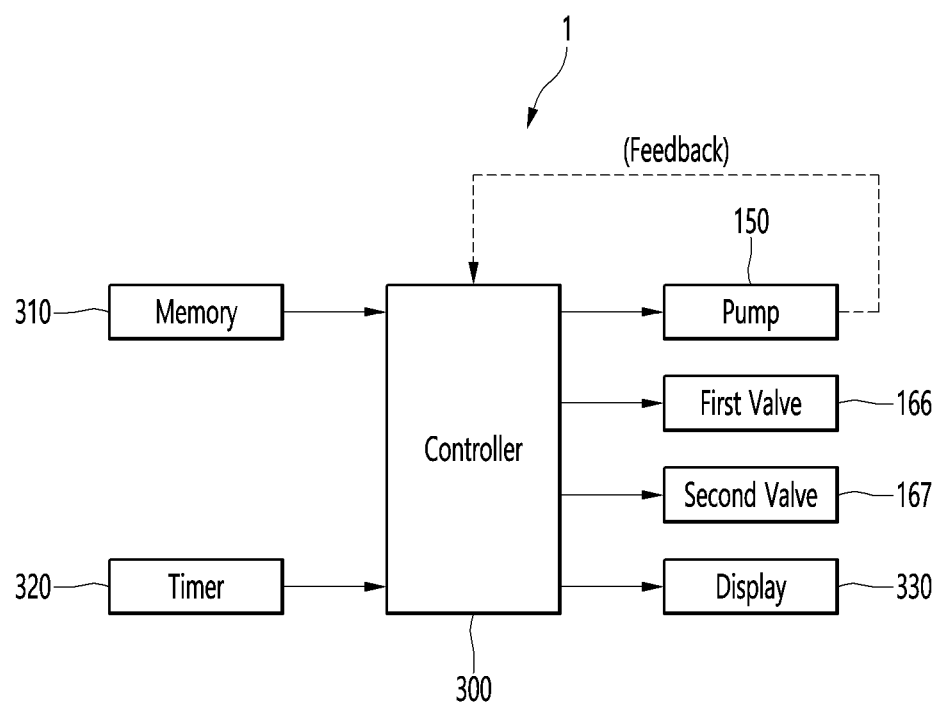
FIG. 3 is a block diagram of an air conditioning apparatus according to an embodiment.
Figure 4:
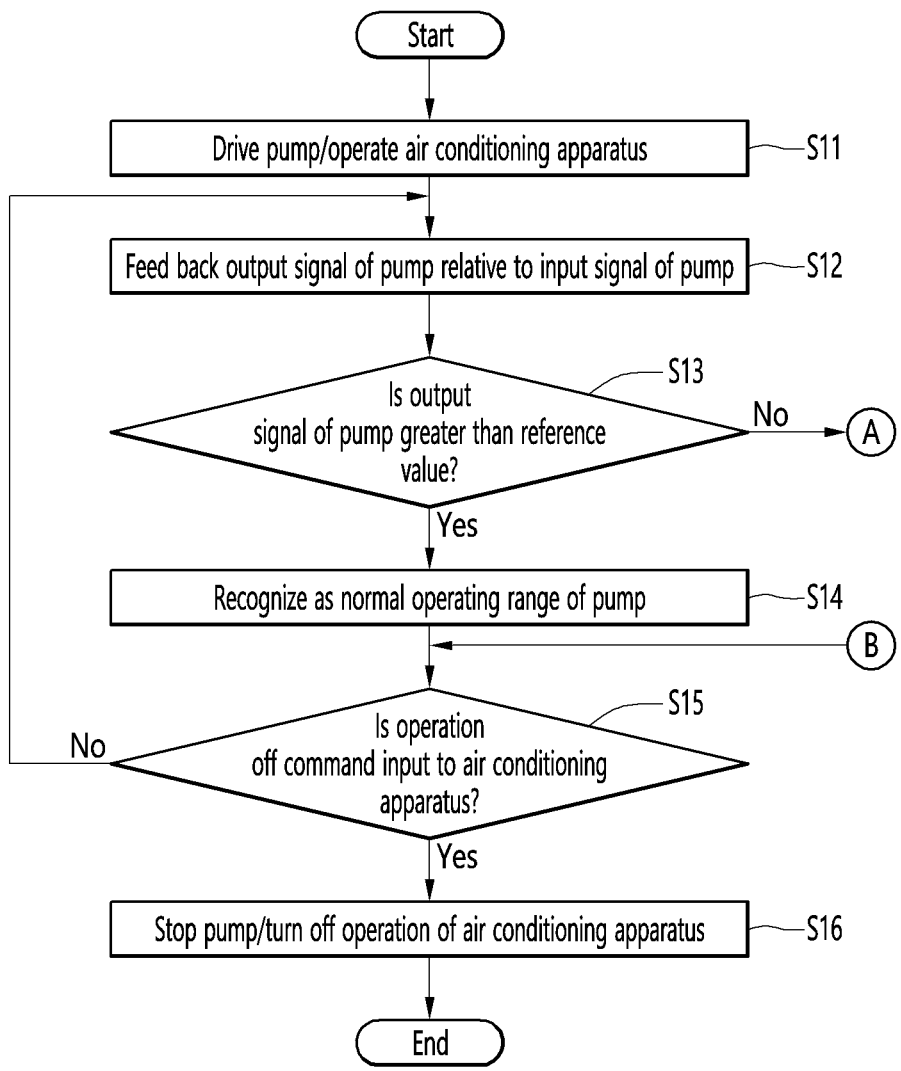
FIGS. 4 and 5 are flowcharts of a method for controlling an air conditioning apparatus according to an embodiment.
Figure 5:
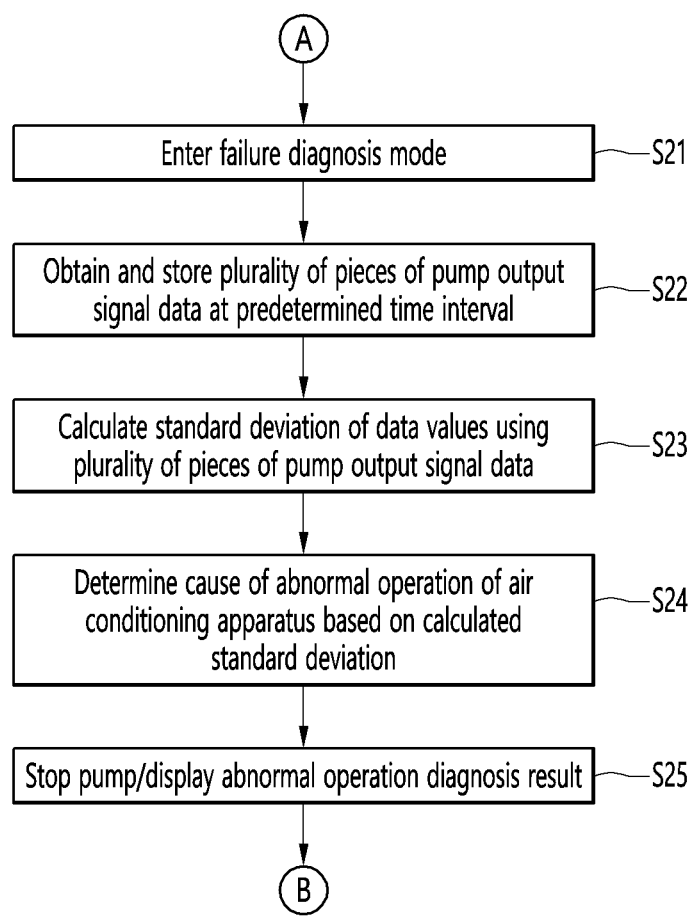
Figure 6:
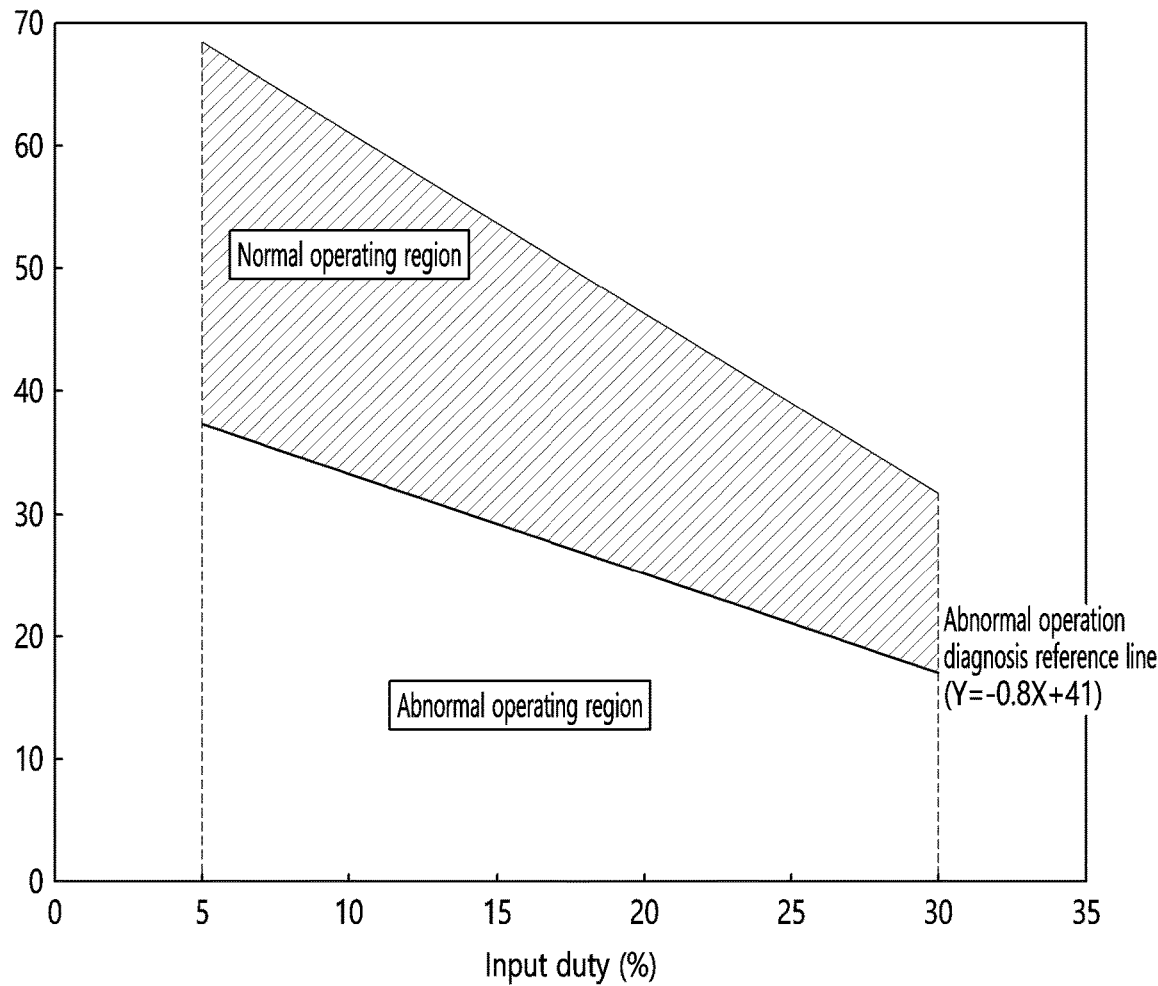
FIG. 6 is a graph showing a normal operating region and an abnormal operating region of an air conditioning apparatus, based on a value of an output signal relative to an input signal of a pump, according to an embodiment.

FIG. 3 is a block diagram of an air conditioning apparatus according to an embodiment. FIGS. 4 and 5 are flowcharts of a method for controlling an air conditioning apparatus according to an embodiment. FIG. 6 is a graph showing a normal operating region and an abnormal operating region of the air conditioning apparatus, based on a value of an output signal relative to an input signal of a pump, according to an embodiment.

Referring to FIG. 3, the air conditioning apparatus 1 according to an embodiment may include a controller 300 that controls driving of a pump 150 to forcibly circulate a fluid, such as water, between heat exchange device 100 and a plurality of indoor units. The pump 150 may include first pump 151 and second pump 152 described above.

The controller 300 may control an amount of fluid, such as water, circulating through the air conditioning apparatus 1 through a duty control of the pump 150. The controller 300 may apply an input signal to the pump 150, feed back an output signal detected from the pump 150, and determine whether an abnormal operation of the air conditioning apparatus 1 has occurred.

FIG. 6 shows a graph of a change in output duty according to an input duty of the pump 150. The duty of the pump 150 represents a ratio (%) of a high signal per unit time. For example, when the unit time (1 ms) is 1 cycle, if a high signal is applied for 0.8 ms and a low signal is applied for 0.2 ms, the input duty may be 80%.

The duty of the pump 150 may be determined as a ratio (%) of a low signal per unit time, and control of the pump may be performed. The pump 150 may be designed such that the output duty decreases as the input duty increases.

For example, when the input duty of the pump 150 is 5%, it can be understood that the pump 150 is operating in the normal operating region when the output duty of the output signal of the pump 150 is greater than a reference value, that is, about 35%. It can be understood that the pump 150 is operating in the normal operation region if the output duty is about 33% or more when the input duty of the pump 150 is 10%, if the output duty is about 30% or more when the input duty is 15%, if the output duty is about 25% or more when the input duty is 20%, if the output duty is about 20% or more when the input duty is 25%, and if the output duty is about 17% or more when the input duty is 30%.

In contrast, when the input duty of the pump 150 is 5%, it can be understood that the pump 150 is operating in the abnormal operating region when the output duty is equal to or less than 35%. Similarly, it can be understood that the pump 150 is operating in the abnormal operation region if the output duty is equal to or less than about 33% when the input duty of the pump 150 is 10%, if the output duty is less about 30% when the input duty is 15%, if the output duty is equal to or less than about 25% when the input duty is 20%, if the output duty is equal to or less than about 20% when the input duty is 25%, and if the output duty is equal to or less than about 17% when the input duty is 30%.

According to the change in the input duty of the pump 150, a line connecting a reference value for distinguishing the normal operating region and the abnormal operating region of the pump 150 may be referred to as an "abnormal operation diagnosis reference line". For example, the abnormal operation diagnosis reference line may be determined in advance by the following equation.

$$Y = -0.8 * X + 41 \text{ } (X: \text{ input duty}, Y: \text{ output duty})$$

That is, after the input duty is determined and applied to the pump 150 and the output signal of the pump 150 is detected (feedback), when the duty of the detected output signal is higher than the abnormal operation diagnosis reference line, the controller 300 may recognize that the pump 150 is operating in the normal operating region. On the other hand, when the duty of the detected output signal is below the abnormal operation diagnosis reference line, the controller 300 may recognize that the pump 150 is operating in the abnormal operating region and may perform a failure diagnosis mode.

The air conditioning apparatus 1 may further include a memory 310 that stores information about the input duty and the output duty of the pump so as to determine abnormal operation of the air conditioning apparatus 1. The memory 310 may store mapped information about the input duty and the output duty of the pump 150, that is, mapping information about the abnormal operation diagnosis reference line for determining the normal operating region or the abnormal operating region.

When the air conditioning apparatus 1 performs the failure diagnosis mode, the air conditioning apparatus 1 may collect a plurality of pieces of data (samples) about the output duty of the pump 150 at a predetermined time interval and store the collected data (samples) in the memory 310. The air conditioning apparatus 1 may further include a timer 320 that counts the predetermined time interval.

For example, the predetermined time interval may be determined within a range of 0.5 seconds to 1.5 seconds. The number of data (samples) may be determined to be ten or more, for example, 20 to 30.

The collection of the plurality of pieces of data (samples) should be continuously made without time disconnection. That is, when the predetermined time interval is 1 second, data has to be collected for 29 seconds in order to collect 30 pieces of data. When the data collection fails during a specific time interval during the data collection process, the previously collected data may be reset and the data collection may start again from the beginning.

[Table 1] below shows an example of collecting a plurality of pieces of data (samples).

TABLE 1

| time (time interval: 1 second) | Input signal of pump (input duty) | Output signal of pump (output duty) |
|---|---|---|
| 0:39:51 | A | B1 |
| 0:39:52 | A | B2 |
| 0:39:53 | A | B3 |
| 0:39:54 | A | B4 |
| 0:39:55 | A | B5 |
| 0:39:56 | A | B6 |
| 0:39:57 | A | B7 |
| 0:39:58 | A | B8 |
| 0:39:59 | A | B9 |
| 0:40:00 | A | B10 |
| 0:40:01 | A | B11 |
| 0:40:02 | A | B12 |
| 0:40:03 | A | B13 |
| 0:40:04 | A | B14 |
| 0:40:05 | A | B15 |
| 0:40:06 | A | B16 |
| 0:40:07 | A | B17 |
| 0:40:08 | A | B18 |
| 0:40:09 | A | B19 |
| 0:40:10 | A | B20 |

Referring to [Table 1], it is possible to collect and store the change in 20 pump output signals relative to the pump input signal with a time interval of 1 second. For example, it is shown that the pump input signal (input duty, A) is 5%, and the pump output signal (output duty, B1 to B20) has a value within range of 30 to 35%. When it is detected that the pump output signal has a value above the abnormal operation diagnosis reference line within the time interval for collecting data, this corresponds to operation in the normal operating region. Therefore, the collected pump output signal is reset, and when it is detected that the duty of the pump output signal has a value below the reference line, the collection may be performed again from the beginning.

For example, if the duty of the pump input signal is 5%, when it is detected that the duty of the pump output signal has a value of 35% or more as the reference value, the collected data (samples) may be reset. When it is detected that the duty of the pump output signal has a value equal to or less than the reference value, the collection of a plurality of pieces of data (samples) may be started again.

The "sample standard deviation" may be calculated using average and variance values of the plurality of pieces of data (samples) stored in the memory 310. The variance value represents the average value of the squared deviation between the average and the sample.

The sample standard deviation is calculated as follows.

$$S = \sqrt{\frac{\sum_{i=1}^{n}(X_i - X_{avg})^2}{n-1}}$$

$X_i$: measured value of $i^{th}$ object
$X_{avg}$: sample average
S: sample standard deviation
n=sample size (number)

On the other hand, when the sample standard deviation is calculated, some pieces of initial data among the plurality of pieces of data may be excluded. This is because the initial signal value among the output signals of the pump 150 may be incorrectly received or incorrectly detected for unintended reasons. For example, when 30 pieces of data (samples) are collected, five pieces of the initial data (samples) may be excluded.

When it is determined that the calculated sample standard deviation is equal to or less than a set or predetermined value, that is, when it is determined that the output duty of the pump 150 is low and the standard deviation of the plurality of pieces of data is not large, it may be recognized that clogging of the fluid pipes or valves 166 and 167 has occurred. Clogging of the fluid pipes or valves 166 and 167 may occur when a freeze and burst occurs in the heat exchange device (plate heat exchanger).

In summary, when the output duty is concentrated in a low region, it is determined that fluid flow in the fluid pipe has dropped below a certain flow rate, and it is recognized as clogging of the pipe or valve, not introduction of air into the fluid pipe.

For example, the predetermined value may be 1. When it is determined that abnormal operation of the air conditioning apparatus occurs due to clogging of the pipe or valve, drive of the pump 150 may be stopped and repair or replacement of the heat exchanger (plate heat exchanger), the pipe, or the valve may be performed. Therefore, it is possible to perform diagnosis and provide a solution through the above control before the plate heat exchanger is completely frozen and bursts.

On the other hand, when it is determined that the calculated standard deviation is greater than the predetermined value, that is, when it is determined that the output duty of the pump 150 is low and the standard deviation of the plurality of pieces of data is relatively large, it may be recognized that air is introduced into the fluid pipe. In summary, when the output signal of the pump 150 changes above a certain level in the process in which a low output duty is formed, it is recognized that air is introduced into the fluid pipe and the fluid pressure in the fluid pipe changes relatively largely. When it is determined that an operation efficiency of the air conditioning apparatus is reduced due to the introduction of air into the fluid pipe, driving of the pump 150 may be stopped and an air purge valve, for example, may be operated to discharge air from the fluid pipe.

The air conditioning apparatus 1 may further include display 330 that determines a cause of abnormal operation of the air conditioning apparatus based on the calculated sample standard deviation and displays the result. The display 330 may also display information about the cause of the abnormal operation along with an error indication display indicating the abnormal operation of the air conditioning apparatus.

A method for controlling an air conditioning apparatus, such as air conditioning apparatus 1, according to an embodiment, will be described with reference to FIGS. 4 and 5.

The pump 150 may be driven and operation of the air conditioning apparatus 1 started (S11). The controller 300 may apply an input signal to the pump 150 and feed an output signal back to the pump 150 (S12).

It is determined whether the output signal of the pump 150, that is, the output duty is greater than a reference value (S13). The reference value refers to a value indicated by an abnormal operation diagnosis reference line according to a specific input signal.

When it is detected that the pump output signal is greater than the reference value, it may be recognized that the air conditioning apparatus is operating in a normal operating region (S14). Operations S12 to S14 may be repeatedly performed until an operation off command is input to the air conditioning apparatus 1. When the operation off command is input to the air conditioning apparatus 1, the pump 150 may be stopped and operation of the air conditioning apparatus 1 may be turned off (S15, S16).

In operation S13, when it is recognized that the output signal of the pump 150 is equal to or less than the reference value, the air conditioning apparatus 1 may enter a failure diagnosis mode. When the output signal is equal to or less than the reference value, it may mean that a flow rate of fluid circulating through the indoor unit and the heat exchange device is reduced or is not constant.

When the failure diagnosis mode is performed, the controller 300 may obtain a plurality of pieces of data (samples) related to the output signal of the pump 150 at the predetermined time interval and store the obtained data (samples) in the memory 310. The plurality of pieces of data (samples) may be continuously collected. When data collection fails during a specific time interval during the data collection process, the previously collected data may be reset and the data collection may start again from the beginning.

In addition, when it is recognized that the output signal of the pump 150 is greater than the reference value in the process of collecting the plurality of pieces of data (samples), the plurality of pieces of previously collected data (samples) may be reset. Thereafter, the process may return to operation S13, and when it is detected that the output signal of the pump 150 is equal to or less than the reference value, the failure diagnosis mode may be started again (S21, S22).

The sample standard deviation may be calculated using the plurality of pieces of data (samples) (S23). The sample standard deviation represents a value associated with a change rate of the flow rate in a state in which the flow rate of the pump is low. When the sample standard deviation is small, a low flow rate is continuously maintained. In this case, it may be recognized that clogging of the fluid pipe or valves 166 and 167 has occurred.

Therefore, when the sample standard deviation is equal to or less than the predetermined value, the controller 300 may determine the cause of the abnormal operation of the air conditioning apparatus as "clogging of the pipe or the valve". The predetermined value may be 1.

On the other hand, when the sample standard deviation is large, it indicates that deviation of the flow rate increases. In this case, it may be recognized that air is introduced into the fluid pipe and a change in the fluid pressure is great. Therefore, when the sample standard deviation is greater than the predetermined value, the controller 300 may determine the cause of the abnormal operation of the air conditioning apparatus as "introduction of air into the fluid pipe".

As such, when the cause of the abnormal operation of the air conditioning apparatus is determined based on the sample standard deviation, the controller 300 may stop the pump 150 and display the abnormal operation diagnosis result on the display 330. Based on the displayed result, the user may repair or replace the air conditioning apparatus 1. Therefore, it is possible to promptly cope with abnormal operation of the air conditioning apparatus.

An air conditioning apparatus according to embodiments disclosed herein has at least the following advantages.

First, it is possible to directly check abnormal operation of the air conditioning apparatus, in particular, introduction of air into the air conditioning apparatus or clogging of a valve, using an output signal of the pump. Second, it is possible to promptly check abnormal operation of the air conditioning apparatus and perform repair or replacement accordingly by performing a failure diagnosis mode when the output signal of the pump is analyzed and a value of the output signal sufficient to the input signal of the pump is not detected.

Third, when the output signal of the pump is not within a normal operating range, a standard deviation for the plurality of output signals is calculated and a cause of the abnormal operation of the pump is determined based on whether the calculated standard deviation is greater than a specific value. Fourth, guide information for solving the abnormal operation of the air conditioning apparatus may be output by displaying a diagnosis result based on the cause of the abnormal operation of the air conditioning apparatus. Therefore, user convenience may be increased.

Embodiments disclosed herein relate to an air conditioning apparatus and a method for controlling an air conditioning apparatus, which can directly check an abnormal operation of the air conditioning apparatus, in particular introduction of air into the air conditioning apparatus or clogging of a valve, using the output signal of the pump. Therefore, embodiments disclosed herein are remarkably industrially applicable.

Embodiments disclosed herein provide an air conditioning apparatus and a method for controlling an air conditioning apparatus, which can directly check whether an abnormal operation of the air conditioning apparatus, in particular, whether air is introduced into the air conditioning apparatus or whether a valve is clogged, using an output signal of a pump. Embodiments disclosed herein also provide an air conditioning apparatus and a method for controlling an air conditioning apparatus, which can promptly check an abnormal operation of the air conditioning apparatus and indicate the repair or replacement are necessary accordingly by performing a failure diagnosis mode when the output signal of the pump is analyzed and a value of the output signal sufficient to the input signal of the pump is not detected.

Embodiments disclosed herein also provide an air conditioning apparatus and a method for controlling an air conditioning apparatus, wherein, when the output signal of the pump is not within a normal operating range, a standard deviation for a plurality of output signals is calculated and a cause of abnormal operation of the pump is determined based on whether the calculated standard deviation is greater than a specific value. Embodiments disclosed herein furthermore provide an air conditioning apparatus and a method for controlling an air conditioning apparatus, which can output guide information for solving abnormal operation of the air conditioning apparatus by displaying a diagnosis result based on a cause of the abnormal operation.

An air conditioning apparatus according to embodiments disclosed herein is provided with a controller that performs abnormal operation diagnosis of the air conditioning apparatus based on an output signal of a pump, thereby directly checking the introduction of air into pipes or clogging of valves. In addition, a value of the output signal of the pump is used to determine whether the air conditioning apparatus is operating in a normal operating range. When operating in an abnormal operating range, the air conditioning apparatus performs a failure diagnosis mode, thereby achieving efficient operations of the air conditioning apparatus and preventing the abnormal operation of the air conditioning apparatus at an early stage.

In addition, as the cause of the abnormal operation of the air conditioning apparatus may be accurately determined using the standard deviation together with the average value of the output signal of the pump, based on characteristics of a fluid, such as water, circulating in the fluid pipe, abnormal operation of the air conditioning apparatus may be quickly resolved.

According to embodiments disclosed herein, an air conditioning apparatus is provided that may include an outdoor unit through which a refrigerant circulates, the outdoor unit including a compressor and an outdoor heat exchanger, an indoor unit to which a fluid, such as water, is supplied, a heat exchanger configured to perform heat exchange between the refrigerant and the fluid, a fluid pipe that connects the heat exchanger to the indoor unit, the fluid pipe being configured to guide circulation of the fluid in the heat exchanger and the indoor unit, a pump installed in the fluid pipe to forcibly circulate the fluid, and a controller configured to perform feedback control on an output signal of the pump. When a duty value of the output signal of the pump is equal to or less than a reference value, the controller may be configured to determine that the fluid pipe is clogged or air is introduced into the fluid pipe.

The controller may be configured to map a reference value with respect to an input signal applied to the pump. As the input signal increases, the reference value of the output signal may be mapped to decrease.

When the duty value of the output signal of the pump is equal to or less than the reference value, the controller may be configured to collect a plurality of pieces of output signal data at a predetermined time interval. The predetermined time interval may be determined within a range of 0.5 seconds to 1.5 seconds.

The plurality of pieces of output signal data may include at least ten pieces of output signal data. The plurality of pieces of output signal data may be data that is continuously collected at the predetermined time interval.

The controller may be configured to reset the previously collected output signal data when the controller fails to collect the output signal data at a specific time interval in the process of collecting the plurality of pieces of output signal data. The controller may be configured to reset the previously collected output signal data when the output signal data of the pump is greater than the reference value in the process of continuously collecting the plurality of pieces of output signal data.

The controller may be configured to calculate a standard deviation of the plurality of pieces of output signal data using the plurality of pieces of collected output signal data, and determine whether the fluid pipe is clogged or air is introduced into the fluid pipe, based on the calculated standard deviation. The controller may be configured to, when the standard deviation is equal to or less than a set or predetermined value, determine that the clogging of the fluid pipe has occurred, and when the standard deviation is greater than the set value, determine that the introduction of the air into the fluid pipe has occurred.

The air conditioning apparatus may further include a display configured to output an error message indicating that the clogging of the fluid pipe or introduction of the air into the fluid pipe has occurred. When the duty value of the output signal of the pump is equal to or less than the reference value, the controller may be configured to stop driving the pump and output the error message on the display. When the duty value of the output signal of the pump is greater than the reference value, the controller may be configured to recognize that the pump is operating in a normal operating region.

According to embodiments disclosed herein, a method for controlling an air conditioning apparatus may include an outdoor unit through which a refrigerant circulates, the outdoor unit including a compressor and an outdoor heat exchanger, an indoor unit to which a fluid, such as water, is supplied, a heat exchanger configured to perform heat exchange between the refrigerant and the fluid, a fluid pipe that connects the heat exchanger to the indoor unit, the fluid pipe being configured to guide circulation of the fluid in the heat exchanger and the indoor unit, a pump installed in the fluid pipe to forcibly circulate the fluid, and a controller configured to perform feedback control on an output signal of the pump. The method may include applying an input signal to the pump and detecting a duty value of an output signal, determining whether the duty value of the output signal is greater than a reference value, and performing a failure diagnosis mode when the duty value of the output signal is equal to or less than the reference value.

The performing of the failure diagnosis mode may include collecting a plurality of pieces of data with respect to the output signal of the pump at a predetermined time interval, and calculating a standard deviation of the plurality of pieces of collected data. The method may further include displaying whether an error related to clogging of the fluid pipe or introduction of air into the fluid pipe has occurred, based on the calculated standard deviation.

When the standard deviation is equal to or less than a set or predetermined value, the method may include displaying that the clogging of the fluid pipe has occurred. When the standard deviation is greater than the set value, the method may include displaying that the introduction of the air into the fluid pipe has occurred.

The details of one or more embodiments are set forth in the accompanying drawings and the description below. Other features will be apparent from the description and drawings, and from the claims.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioning apparatus, comprising:
   an outdoor unit through which a refrigerant circulates, the outdoor unit including a compressor and an outdoor heat exchanger;
   an indoor unit to which a fluid is supplied;
   a heat exchanger configured to perform heat exchange between the refrigerant and the fluid;
   a pipe that connects the heat exchanger to the indoor unit, the pipe being configured to guide the circulation of the fluid in the heat exchanger and the indoor unit;
   a pump installed in the pipe to forcibly circulate the fluid; and
   a controller configured to perform feedback control on an output signal of the pump, wherein when a duty value of the output signal of the pump is equal to or less than a reference value, the controller is configured to determine that the pipe is clogged or air is introduced into the pipe, and wherein the controller is configured to map the reference value with respect to an input signal applied to the pump, and wherein as the input signal increases, the reference value of the output signal is mapped to decrease.

2. An air conditioning apparatus, comprising:
   an outdoor unit through which a refrigerant circulates, the outdoor unit including a compressor and an outdoor heat exchanger;
   an indoor unit to which a fluid is supplied;
   a heat exchanger configured to perform heat exchange between the refrigerant and the fluid;
   a pipe that connects the heat exchanger to the indoor unit, the pipe being configured to guide the circulation of the fluid in the heat exchanger and the indoor unit;
   a pump installed in the pipe to forcibly circulate the fluid; and
   a controller configured to perform feedback control on an output signal of the pump, wherein when a duty value of the output signal of the pump is equal to or less than a reference value, the controller is configured to determine that the pipe is clogged or air is introduced into the pipe, and wherein when the duty value of the output signal of the pump is equal to or less than the reference value, the controller is configured to collect a plurality of pieces of output signal data at a predetermined time interval.

3. The air conditioning apparatus according to claim 2, wherein the predetermined time interval is determined within a range of 0.5 seconds to 1.5 seconds.

4. The air conditioning apparatus according to claim 2, wherein the plurality of pieces of output signal data includes at least ten pieces of output signal data.

5. The air conditioning apparatus according to claim 2, wherein the plurality of pieces of output signal data is data continuously collected at the predetermined time interval.

6. The air conditioning apparatus according to claim 5, wherein the controller is configured to reset previously collected output signal data when the controller fails to collect the output signal data at a specific time interval in the collecting of the plurality of pieces of output signal data.

7. The air conditioning apparatus according to claim 5, wherein the controller is configured to reset previously collected output signal data when the output signal data of the pump is greater than the reference value in the continuously collecting of the plurality of pieces of output signal data.

8. The air conditioning apparatus according to claim 2, wherein the controller is configured to:
   calculate a standard deviation of the plurality of pieces of output signal data using the plurality of pieces of collected output signal data; and
   determine whether the pipe is clogged or air is introduced into the pipe, based on the calculated standard deviation.

9. The air conditioning apparatus according to claim 8, wherein the controller is configured to:
   when the standard deviation is equal to or less than a predetermined value, determine that the clogging of the pipe has occurred; and
   when the standard deviation is greater than the predetermined value, determine that the introduction of the air into the pipe has occurred.

10. An air conditioning apparatus, comprising:
    an outdoor unit through which a refrigerant circulates, the outdoor unit including a compressor and an outdoor heat exchanger;
    an indoor unit to which a fluid is supplied;
    a heat exchanger configured to perform heat exchange between the refrigerant and the fluid;
    a pipe that connects the heat exchanger to the indoor unit, the pipe being configured to guide the circulation of the fluid in the heat exchanger and the indoor unit;
    a pump installed in the pipe to forcibly circulate the fluid;
    a controller configured to perform feedback control on an output signal of the pump, wherein when a duty value of the output signal of the pump is equal to or less than a reference value, the controller is configured to determine that the pipe is clogged or air is introduced into the pipe; and
    a display configured to output an error message indicating that the clogging of the pipe or the introduction of the air into the pipe has occurred, wherein when the duty value of the output signal of the pump is equal to or less than the reference value, the controller is configured to stop driving of the pump and output the error message on the display.

11. The air conditioning apparatus according to claim 10, wherein when the duty value of the output signal of the pump is greater than the reference value, the controller is configured to recognize that the pump is operating in a normal operating region.

12. A method for controlling an air conditioning apparatus, the air conditioning apparatus comprising an outdoor unit through which a refrigerant circulates, the outdoor unit including a compressor and an outdoor heat exchanger; an indoor unit to which a fluid is supplied; a heat exchanger configured to perform heat exchange between the refrigerant and the fluid; a pipe that connects the heat exchanger to the indoor unit, the pipe being configured to guide circulation of the fluid in the heat exchanger and the indoor unit; a pump installed in the pipe to forcibly circulate the fluid; and a controller configured to perform feedback control on an output signal of the pump, the method comprising:

applying an input signal to the pump and detecting a duty value of an output signal;

determining whether the duty value of the output signal is greater than a reference value; and performing a failure diagnosis mode when the duty value of the output signal is equal to or less than the reference value.

13. The method according to claim 12, wherein the performing of the failure diagnosis mode comprises:

collecting a plurality of pieces of data with respect to the output signal of the pump at a predetermined time interval; and calculating a standard deviation of the plurality of pieces of collected data.

14. The method according to claim 13, further comprising:

displaying whether an error related to clogging of the pipe or introduction of air into the pipe has occurred, based on the calculated standard deviation;

when the standard deviation is equal to or less than a predetermined value, displaying that the clogging of the pipe has occurred; and when the standard deviation is greater than the predetermined value, displaying that the introduction of the air into the pipe has occurred.

15. An air conditioning apparatus, comprising:
an outdoor unit through which a refrigerant circulates;
an indoor unit to which a fluid is supplied;
a heat exchanger configured to perform heat exchange between the refrigerant and the fluid;
a pipe that connects the heat exchanger to the indoor unit;
a pump installed in the pipe to forcibly circulate the fluid; and
a controller configured to perform feedback control on an output signal of the pump, wherein the controller is configured to:
when the duty value of the output signal of the pump is greater than a reference value, recognize that the pump is operating in a normal operating region; and
when the duty value of the output signal of the pump is equal to or less than the reference value, recognize that an abnormal operation of the pump has occurred, and wherein the controller is configured to:
when the duty value of the output signal of the pump is equal to or less than the reference value, collect a plurality of pieces of output signal data at a predetermined time interval; and
calculate a standard deviation of the plurality of pieces of output signal data using the plurality of pieces of collected output signal data.

16. The air conditioning apparatus according to claim 15, wherein the controller is configured to:

when the standard deviation is equal to or less than a predetermined value, determine that the clogging of the pipe has occurred; and when the standard deviation is greater than the predetermined value, determine that the introduction of the air into the pipe has occurred.

17. The air conditioning apparatus according to claim 16, further comprising a display configured to output an error message when the abnormal operation of the pump occurs, wherein, when the duty value of the output signal of the pump is equal to or less than the reference value, the controller is configured to stop driving of the pump and output the error message on the display.

18. An air conditioning apparatus, comprising:
an outdoor unit through which a refrigerant circulates;
an indoor unit to which a fluid is supplied;
a heat exchanger configured to perform heat exchange between the refrigerant and the fluid;
a pipe that connects the heat exchanger to the indoor unit;
a pump installed in the pipe to forcibly circulate the fluid; and
a controller configured to perform feedback control on an output signal of the pump, wherein the controller is configured to:
when the duty value of the output signal of the pump is greater than a reference value, recognize that the pump is operating in a normal operating region; and
when the duty value of the output signal of the pump is equal to or less than the reference value, recognize that an abnormal operation of the pump has occurred, and wherein, when the duty value of the output signal of the pump is equal to or less than the reference value, the controller is configured to continuously collect at least ten pieces of output signal data at a predetermined time interval.

* * * * *